(12) United States Patent
Antweiler et al.

(10) Patent No.: US 12,252,405 B2
(45) Date of Patent: Mar. 18, 2025

(54) PROCESS AND DEVICE FOR PRODUCING HYDROGEN, CARBON MONOXIDE AND A CARBON-CONTAINING PRODUCT (71) Applicants: ThyssenKrupp Industrial Solutions AG, Essen (DE); ThyssenKrupp AG, Essen (DE); BASF SE, Ludwigshafen (DE)

(72) Inventors: Nicolai Antweiler, Essen (DE); Karsten Büker, Dortmund (DE); Frederik Scheiff, Deidesheim (DE); Andreas Bode, Wezembeek-Oppem (BE)

(73) Assignees: THYSSENKRUPP UHDE GMBH, Dortmund (DE); THYSSENKRUPP AG, Essen (DE)

( * ) Notice: Subject to any disclaimer, the term of this patent is extended or adjusted under 35 U.S.C. 154(b) by 821 days.

(21) Appl. No.: 17/309,737

(22) PCT Filed: Dec. 19, 2019

(86) PCT No.: PCT/EP2019/086469
§ 371 (c)(1),
(2) Date: Jun. 16, 2021

(87) PCT Pub. No.: WO2020/127838
PCT Pub. Date: Jun. 25, 2020

(65) Prior Publication Data
US 2021/0380417 A1    Dec. 9, 2021

(30) Foreign Application Priority Data
Dec. 20, 2018   (DE) .......................... 102018222463.3

(51) Int. Cl.
C01B 32/40 (2017.01)
B01J 8/04 (2006.01)
C01B 3/24 (2006.01)

(52) U.S. Cl.
CPC ............. *C01B 32/40* (2017.08); *B01J 8/0457* (2013.01); *B01J 8/0496* (2013.01); *C01B 3/24* (2013.01);
(Continued)

(58) Field of Classification Search
CPC ..................................... C01B 32/40
See application file for complete search history.

(56) References Cited

U.S. PATENT DOCUMENTS 2,911,293 A    11/1959    Viles
4,025,612 A     5/1977    Barber
(Continued)

FOREIGN PATENT DOCUMENTS

CN    85108595 A    5/1986
CN    1400998 A     3/2003
(Continued)

OTHER PUBLICATIONS

Abbas, H.F. et al: "Hydrogen production by methane decomposition: A review"; International Journal of Hydrogen Energy, Elsevier Science Publishers B.V., Barking, GB, vol. 35, Nr. 3 (Feb. 2010), pp. 1160-1190.
(Continued)

*Primary Examiner* — Stuart L Hendrickson
(74) *Attorney, Agent, or Firm* — Dunlap Bennett & Ludwig, PLLC; Anna L. Kinney (57) ABSTRACT The invention relates to a process for producing hydrogen, carbon monoxide and a carbon-containing product in at least one reaction apparatus, wherein the at least one reaction apparatus comprises a bed of carbon-containing material and
(Continued)

is characterized in that the bed of carbon-containing material in the at least one reaction apparatus is alternately heated to a temperature of >800° C. and, no later than upon reaching a temperature of 1800° C., cooled to a maximum of 800° C., wherein hydrogen and carbon monoxide are produced during the heating phase and carbon and hydrogen are produced during the cooling phase.

13 Claims, 2 Drawing Sheets

(52) U.S. Cl.
CPC ............... *C01B 2203/0272* (2013.01); *C01B 2203/0822* (2013.01); *C01B 2203/1241* (2013.01); *C01B 2203/148* (2013.01); *C01B 2203/1614* (2013.01)

(56) References Cited

U.S. PATENT DOCUMENTS

| | | | |
|---|---|---|---|
| 4,052,173 | A | 10/1977 | Schulz |
| 5,486,216 | A | 1/1996 | Shigeno et al. |
| 9,834,440 | B2 * | 12/2017 | Kern ................. C01B 32/40 |
| 10,099,923 | B2 | 10/2018 | Machhammer et al. |
| 2002/0113228 | A1 | 8/2002 | Kim et al. |
| 2003/0235529 | A1 | 12/2003 | Hershkowitz et al. |
| 2014/0127121 | A1 | 5/2014 | Maaß et al. |
| 2015/0336795 | A1 | 11/2015 | Kern et al. |
| 2018/0273380 | A1 | 9/2018 | Maaß et al. |

FOREIGN PATENT DOCUMENTS

| | | |
|---|---|---|
| CN | 103687802 A | 3/2014 |
| CN | 204848773 U | 12/2015 |
| CN | 105531355 A | 4/2016 |
| CN | 207002649 U | 2/2018 |
| CN | 108779404 A | 11/2018 |
| EP | 0178853 A2 | 4/1986 |
| EP | 1530549 B1 | 12/2011 |
| EP | 2935098 B1 | 2/2018 |
| EP | 3194333 B1 | 7/2018 |
| KR | 20010067022 A | 7/2001 |
| RU | 2473663 C2 | 4/2011 |
| RU | 2650171 C1 | 12/2013 |
| RU | 2650171 C2 | 4/2018 |
| WO | 2013004398 A2 | 1/2013 |
| WO | 2013004398 A3 | 1/2013 |
| WO | 2015035969 A2 | 3/2015 |
| WO | 2016026562 A1 | 2/2016 |

OTHER PUBLICATIONS

International Search Report dated Jun. 9, 2020, with English language translation.

* cited by examiner

Figure 2

PROCESS AND DEVICE FOR PRODUCING HYDROGEN, CARBON MONOXIDE AND A CARBON-CONTAINING PRODUCT

CROSS-REFERENCE TO RELATED APPLICATION

This application is a 371 of international application number PCT/EP2019/086469, filed Dec. 19, 2019 and claims the benefit of priority of German application number DE 102018222463.3, filed Dec. 20, 2018, the contents of which are herein incorporated by reference.

BACKGROUND OF THE INVENTION

The invention relates to a process for producing hydrogen, carbon monoxide and a carbon-containing product in at least one reaction apparatus, wherein alternately hydrogen and carbon monoxide are produced during the heating phase and carbon and hydrogen are produced during the cooling phase and the overall process can be repeated cyclically and continuously, to an apparatus for performing the process and to the use of the carbon-containing product.

Significant areas of the global economy rely on crude oil as a raw material source or energy source. For example, petrol and diesel fuels for private transport and freight traffic, heavy heating oil for nautical traffic and as a fuel for power plants, and light heating oil for heating residences, are obtained from crude oil. But many raw materials in the chemical industry also originate directly or indirectly from crude oil. However, crude oil contributes considerably to environmental pollution as a result of the release of carbon dioxide, methane and nitrous oxide.

The emission of carbon dioxide into the earth's atmosphere has increased dramatically since the beginning of industrialization, primarily because of the combustion of fossil fuels (by industry, electricity generation, heating and traffic). Carbon dioxide in the atmosphere acts as a greenhouse gas and is directly linked with nature-altering phenomena such as for example with global warming (the greenhouse effect).

Carbon dioxide is present in the earth's atmosphere at a content of about 0.04%, and contributes 9 to 26% of the natural greenhouse effect. The geogenic, i.e. natural, $CO_2$ emission amounts to approximately 550 Gt per year. However, this is offset by an approximately equal natural consumption, in particular by photosynthesis, but also by binding in calcium carbonate-forming organisms. Global anthropogenic carbon dioxide emissions in 2014 were just under 36 Gt and made up approximately 60% of the human-induced additional greenhouse effect. The current global $CO_2$ trend shows that the annual growth in $CO_2$ emissions (approx. 400 to 800 million t) is continuing unabated. In addition, emissions have increased the concentration of carbon dioxide in the earth's atmosphere since the beginning of industrialization from 280 ppm to 400 ppm (as of 2015).

In order to reduce pollutant emissions and counteract the associated climate catastrophe, members of the UNO first set internationally legally binding targets for greenhouse gas emissions in industrialized countries in the Kyoto Protocol, the objective of which is climate protection. Within a first "commitment period" (2008 to 2012), the Protocol provided for a reduction in the annual greenhouse gas emissions of industrialized countries by an average of 5.2% compared to the situation in 1990. An extension of the Kyoto Protocol to 2020 was agreed for a second commitment period.

Carbon dioxide emissions in Germany were reduced by 17.2% from 1990 to 2004. In addition, the EU achieved a considerable reduction in emissions in the first commitment period of the Kyoto Protocol. By the end of 2012, a decrease in greenhouse gas emissions of about 18% was attained compared to 1990. This markedly exceeded the EU's goal of reducing emissions by 8%.

Nevertheless, there is an ongoing goal of lowering carbon dioxide emissions. However, this goal cannot be achieved solely with renewable energies, and there is also a general interest in process optimizations of the hitherto known processes.

Additionally, emissions of carbon dioxide into the atmosphere not only represent pollution of the environment, but emissions into the environment at the same time represent a loss of carbon as a material of value.

Considerable endeavors are currently underway for replacing crude oil products with other raw materials or alternative processes.

Hydrogen has been an important raw material of the chemical industry for over 100 years. It is required, for example, as a fuel for generating light and heat, for the synthesis of ammonia, the production of methanol, etc. In total, around 20 billion $m^3$ of hydrogen are produced annually in Germany, and globally the figure is around 500 billion $m^3$. This corresponds, both nationally within Germany and globally, to a proportion of 1.5% of the respective energy demand. Many methods for producing hydrogen are known. These include, for example, the use of fossil raw materials as starting product (steam reforming of natural gas or naphtha, partial oxidation of heavy oil, catalytic reforming, coal gasification, etc.) and also electrolysis, which only requires water and electricity. However, all processes share the property of requiring a more or less large amount of energy. The market volume for hydrogen production is 8.26 billion dollars, with a growth rate of 5.6%. 1.5% of the global energy demand is met directly by hydrogen. There will continue to be a great need for affordable hydrogen in the future.

Hydrogen is an essential constituent of synthesis gas. "Synthesis gas" denotes gas mixtures essentially consisting of hydrogen and carbon monoxide, with additions of carbon dioxide, nitrogen, noble gases, methane and other hydrocarbons possibly also being present. Synthesis gas is used as intermediate or starting material of numerous synthesis processes, for example the production of methanol and other alcohols, acetic acid, dimethyl ether, synthetic fuels (Fischer-Tropsch synthesis), synthetic natural gas (SNG), ammonia (Haber-Bosch process), and for oxo syntheses. The basic materials obtainable thereby are important starting materials or intermediates for the chemical industry, for example for preparing active pharmaceutical ingredients, crop protection agents, fertilizers, dyes and plastics. However, most known technologies (e.g. the water shift reaction) for generating and converting synthesis gas have the problem that when synthesizing the required amount of hydrogen a relatively large amount of excess $CO_2$ is produced, which in turn enters the environment as a climate-damaging gas.

In the conventional processes for producing synthesis gas, such as for example in steam reforming or coal gasification, or else due to the Boudouard equilibrium, carbon dioxide is formed in addition to the synthesis gas. Moreover, the reactions taking place are highly endothermic and therefore require an external input of energy, for which reason these processes are not economical.

Steam reforming is the most widespread process for producing hydrogen-rich synthesis gas from light hydrocarbons:

$$CH_4 + H_2O \rightleftharpoons CO + 3H_2, \Delta H = +206.2 \text{ kJ/mol.}$$

The carbon monoxide can react in the water-gas shift reaction with further steam to give carbon dioxide ($CO_2$) and hydrogen:

$$CO + H_2O \rightleftharpoons CO_2 + H_2, \Delta H = -41.2 \text{ kJ/mol.}$$

Synthesis gas can for example also be produced by coal gasification. For coal gasification with steam and oxygen, the exothermic partial combustion of carbon and the endothermic water gas formation constitute the actual gasification reactions. Via the endothermic reaction:

$$C + H_2O \rightleftharpoons CO + H_2, \Delta H = +131 \text{ kJ/mol}$$

what is known as water gas, a mixture of carbon monoxide and hydrogen, is formed in an equilibrium reaction from coal, which has been heated by combustion in air beforehand, and steam. This is an equilibrium reaction. The carbon monoxide can also react here in the water-gas shift reaction with further steam to form carbon dioxide ($CO_2$) and hydrogen:

$$CO + H_2O \rightleftharpoons CO_2 + H_2, \Delta H = -41.2 \text{ kJ/mol.}$$

The Boudouard equilibrium describes the equilibrium relationship between carbon, carbon monoxide and carbon dioxide:

$$C + CO_2 \rightleftharpoons CO, \Delta H = +162.5 \text{ kJ/mol.}$$

The position of the Boudouard equilibrium is shifted towards the right as the temperature increases and the pressure decreases. When carbon is combusted in a deficit of oxygen, therefore, <400° C. practically pure $CO_2$ is obtained, >1000° C. only CO is obtained.

The conversion of synthesis gas ($CO+H_2$) into a wide variety of products also requires different molar $H_2/CO$ ratios. The desired $H_2/CO$ ratio can be set by means of CO conversion or $H_2/CO$ separation. For example, for the Fischer-Tropsch synthesis, a molar $H_2/CO$ ratio of two is required. Synthesis gases from solid fuels generally do not achieve this value. For the cobalt-catalyzed Fischer-Tropsch synthesis using, for example, synthesis gas of biomass origin, the $H_2/CO$ ratio is currently set in an upstream CO conversion stage. For the oxo synthesis for producing alcohols or aldehydes from olefins, an $H_2/CO$ ratio of for example one is required.

To date, more than 90% of the hydrogen required by the chemical industry is obtained by the steam reforming of fossil fuels such as natural gas and crude oil. Steam reforming is an industrially applicable method with a high efficiency, and is the most widespread. A disadvantage with this method is the large amount of $CO_2$ it releases. Therefore, alternative production processes are currently being worked on.

The pyrolysis of hydrocarbons can produce hydrogen and carbon while simultaneously keeping the formation and emission of carbon dioxide at a lower level. However, the pyrolysis is highly endothermic and requires reaction temperatures of over 1000° C.

There are currently increased research efforts for producing hydrogen while at the same time reducing $CO_2$ formation/release.

A number of pyrolysis processes for the production of hydrogen and carbon are known from the prior art, these attempting to realize the high temperatures needed and to minimize the $CO_2$ footprint.

By way of example, US 2002/0007594 A1 is concerned with a process for producing hydrogen and carbon by means of thermocatalytic decomposition (or dissociation, pyrolysis or cracking). Carbon-containing fuels are converted over a carbon-based catalyst in the absence of air and/or water in a reactor, the thermal energy necessary for this endothermic reaction being provided by the combustion of a fuel in a separate burner and then being supplied to the reactor.

US 2007/0111051 A1 relates to an apparatus which is suitable for a process as described in US 2002/0007594 A1. That is to say that it relates to the production of hydrogen and carbon by means of a thermocatalytic decomposition of hydrocarbons over a carbon-based catalyst in an air-free and/or anhydrous medium. Here too, the heating is effected externally, in that the reactor is heated via a reaction taking place in a separate burner.

U.S. Pat. No. 5,650,132 describes a process for producing hydrogen by means of pyrolysis of hydrocarbons by contact with a heated, fine-particulate, carbon-containing material having an external surface area of at least 1 m²/g.

WO 2014/097142 A1 relates to a process for the parallel production of hydrogen, carbon monoxide and a carbon-containing product, wherein one or more hydrocarbons are thermally decomposed and at least a portion of the resulting pyrolysis gas is drawn off from the reaction zone of the decomposition reactor at a temperature of from 800 to 1400° C. and reacted with carbon dioxide to form a gas mixture containing carbon monoxide and hydrogen (synthesis gas) in a reverse water-gas shift reactor. The energy required for performing the process can be provided by an oxidative energy source, e.g. with the combustion of natural gas, a solar energy source, e.g. high-temperature solar power plants, or electrical energy sources.

WO 2013/004398 A2 presents a process for the parallel production of hydrogen and carbon-containing products, in which hydrocarbons are introduced into a reaction space (R) and are thermally decomposed into carbon and hydrogen in the presence of a carbon-containing granular material. In this case, at least part of the thermal energy required for the hydrocarbon decomposition is introduced into the reaction space (R) via a gaseous heat transfer medium which is produced outside of the reaction space (R). In the context of the present application, the "reaction apparatus" according to the invention, such as e.g. reaction apparatus (R0), corresponds to the reaction space (R) according to WO 2013/004398 A2. While according to WO 2013/004398 A2 a gaseous heat transfer medium is produced outside of the reaction space (R), i.e. not in the presence of the carbon-containing granular material, it is provided according to the invention that a (gaseous) heat transfer medium is produced in the presence of a bed of carbon-containing material.

U.S. Pat. No. 4,240,805, US 2003/0235529, US 2007/003478 and US 2007/033873 disclose processes for producing synthesis gas or hydrogen-containing gas streams.

Although the more recent known processes for producing hydrogen, carbon monoxide and/or carbon aim to reduce the amounts of the greenhouse gas $CO_2$ produced during the production of chemical compounds, they are not satisfactory in every respect and there is a need for improved processes and apparatuses.

The energy input into the reactor system required for hydrocarbon pyrolysis is one of the major challenges. For example, electrical heating, especially at pressures of up to 30 bar, is technically demanding and is associated with high operating costs and high maintenance expense. At temperatures between 1400° C. and 1800° C., expensive ceramics, such as zirconium oxide, are usually necessary. Regenerative heating by transferring stored energy, by means of a carrier gas stream, is associated with high investment costs.

There remains a need for ensuring the reaction temperatures of greater than 1000° C. required for the endothermic pyrolysis of hydrocarbons to hydrogen by means of processes which are as simple as possible and are also advantageous and reasonable from ecological and economic points of view. In particular, there is this need for processes which are also suitable for large-scale production.

SUMMARY OF THE INVENTION

It is therefore an object of the present invention to provide a process for producing hydrogen, carbon monoxide and a carbon-containing product which does not exhibit the disadvantages of the prior art, or at least does so to a reduced extent.

This object is achieved by the subject matter of the description, the claims and the figures. It has surprisingly been found that, using the process according to the invention, hydrogen, carbon monoxide and a carbon-containing product having satisfactory properties can be obtained without the previous disadvantages. For instance,

- synthesis gas is produced with a very low $CO_2$ footprint,
- a carbon-containing product is obtained as an additional product of value,
- the input of energy into the reactor system/reaction apparatus is markedly improved,
- the novel reaction apparatus, in which the heat formed is optimally reused directly in the process, makes it possible to reduce the external energy input required compared to the prior art,
- the required energy and costs are significantly reduced, and
- the production of hydrogen, carbon monoxide and carbon-containing product is possible in a simplified reaction apparatus which can also be used on a large scale.

One aspect of the invention relates to a process for producing hydrogen, carbon monoxide and a carbon-containing product in at least one reaction apparatus, wherein the at least one reaction apparatus comprises a bed of carbon-containing material and is characterized in that the bed of carbon-containing material in the at least one reaction apparatus is alternately heated to a temperature of >800° C. and, no later than upon reaching a temperature of 1800° C., cooled to a temperature of 900° C., wherein hydrogen and carbon monoxide are produced during the heating phase and carbon and hydrogen are produced during the cooling phase.

In one embodiment, the process comprises the following steps:
(a) providing hydrogen and oxygen
(b) heating the bed of carbon-containing material to a temperature of >800° C. by reacting hydrogen with oxygen
(c) drawing off the hydrogen and carbon monoxide formed
(d) ending the provision of hydrogen and oxygen no later than upon reaching a temperature of the bed of carbon-containing material of 1800° C.
(e) providing a gaseous hydrocarbon stream and decomposing the hydrocarbons in the presence of the bed of carbon-containing material to give carbon and hydrogen, the temperature of the bed of carbon-containing material decreasing in the process
(f) drawing off the hydrogen (g) ending the provision of a gaseous hydrocarbon stream no later than upon reaching a temperature of the bed of carbon-containing material of 900° C.
(h) withdrawing at least a portion of the carbon-containing material of the bed, wherein the carbon-containing material includes a deposit comprising the carbon-containing product wherein steps (a) to (h) are conducted in the at least one reaction apparatus.

The reaction apparatus comprises a bed of carbon-containing material, it also being possible to use the term carbon-containing bed as a synonym. A carbon-containing material is to be understood to mean a material composed of solid particles. The particles are advantageously of spherical form. In one embodiment, the carbon-containing material includes at least 50% by weight, preferably at least 80% by weight, more preferably at least 90% by weight, of carbon, more preferably at least 95% by weight and in particular at least 98% by weight of carbon. In one particularly preferred embodiment, the carbon-containing material consists of carbon.

In principle, the particle size of the carbon-containing material in the bed can be adjusted freely, it is determined, inter alia, by the intended use of the carbon. In one embodiment, the particles of carbon-containing material have an average size in the range from 0.05 to 100 mm or 0.05 to 50 mm or 0.1 to 10 mm or 1 to 8 mm. In a preferred embodiment, the particles of carbon-containing material have an average size in the range from 2 to 4 mm, preferably 2.2 to 3.7 mm, particularly preferably 2.5 to 3.5 mm, very particularly preferably 2.7 to 3.2 mm. The particles may for example be composed of activated carbon, coal, coke, coke breeze or of mixtures of at least two of these types of carbon. In a further embodiment of the process according to the invention, at least a portion of the pyrolysis carbon is recycled, so that the particles are composed of pyrolysis carbon or contain this pyrolysis carbon, possibly in a mixture with one or more of the carbon types mentioned above.

Advantageously, the bed of carbon-containing material is a fixed bed.

The process according to the invention makes it possible, as a result of the temporal separation of combustion and pyrolysis (i.e. decomposition of hydrocarbon) and a cyclical changeover of the reactant feeds (hydrocarbon or $H_2/O_2$), to conduct all steps in one reaction apparatus using the same bed of carbon-containing material and to produce synthesis gas, hydrogen and carbon.

The configuration of the process according to the invention provides that the required energy is generated by the oxidation of hydrogen by means of oxygen. Air and/or oxygen-enriched air and/or oxygen of technical-grade purity may be used as oxygen-containing oxidizing agent. Hydrogen and the oxygen-containing oxidizing agent are mixed and reacted. In a preferred embodiment, hydrogen and the oxygen-containing oxidizing agent are introduced into the reaction apparatus and combusted, preferably at the end of the reaction apparatus at which they are introduced. In one embodiment, this is effected at the top of the reaction apparatus. The energy released during the combustion (oxidation) of the hydrogen is absorbed by the bed of carbon-containing material and stored, the bed heating up in the process.

Typically, the bed of carbon-containing material is heated to a maximum temperature in the range from 1400 to 1800° C. In one embodiment, the maximum temperature is in the range from 1500-1700° C., in another embodiment it is between 1550 to 1650° C.

The water formed during the reaction of hydrogen with oxygen reacts with the carbon in the carbon-containing material of the bed to form carbon monoxide and hydrogen, this gas mixture also being referred to as synthesis gas. The synthesis gas is drawn off at the other end, preferably at the bottom, of the reaction apparatus.

The ratio of hydrogen to carbon monoxide in the synthesis gas can be adjusted via the stoichiometry between the two reactant gases oxygen and hydrogen.

Although the synthesis gas reaction $C+H_2O \rightarrow CO+H_2$ is endothermic, the carbon-containing bed is heated since much more energy is released during the combustion than is needed for the synthesis gas reaction. The exothermic enthalpy of reaction of the combustion reaction is much greater than the endothermic enthalpy of reaction of the synthesis gas reaction, with a ratio of −250/90 kJ/mol.

The introduction of the oxygen and hydrogen is stopped when the bed of carbon-containing material has reached the maximum temperature. The pyrolysis of the hydrocarbon-containing gas is possible within a temperature range from 800° C., preferably 900° C., and the maximum temperature.

When the maximum temperature is reached, the gaseous hydrocarbon stream is provided and introduced into the reaction apparatus. The gaseous hydrocarbon stream is preferably introduced at the end of the reaction apparatus; preferably at the end at which the synthesis gas is drawn off, particularly preferably at the bottom of the reaction apparatus.

In principle, all hydrocarbon may be introduced into the reaction apparatus and decomposed, although preference is given to light hydrocarbons. The hydrocarbon can for example be methane, ethane, propane, butane or mixtures of at least two of these hydrocarbons. The gaseous hydrocarbon stream used is preferably natural gas, the methane content of which is typically between 75% and 99% of the molar fraction depending on the natural gas reservoir and the nature of the processing. Methane is particularly preferred.

The hydrocarbon-containing gas is passed over the heated bed of carbon-containing material and decomposed into hydrogen and carbon by absorbing energy from the bed. This endothermic pyrolysis leads to cooling of the bed of carbon-containing material.

The resulting carbon is deposited on the carbon-containing particles of the bed. The hydrogen formed is drawn off at the other end of the reaction apparatus, preferably at the top of the reaction apparatus.

The pyrolytic decomposition of the hydrocarbon-containing gas is conducted until the bed of carbon-containing material has cooled to ≤900° C., preferably ≤800° C. (cooling temperature). When this maximum cooling temperature has been reached, the introduction and decomposition of the hydrocarbon-containing gas is stopped. In one embodiment, the hydrocarbon is pyrolytically decomposed at a temperature of no less than 900° C., preferably at no less than 950° C., particularly preferably at no less than 1000° C. in the carbon-containing bed.

The hydrocarbon-containing gas is preferably not preheated. In this case, the process according to the invention additionally comprises the step of the exchange of heat between non-preheated hydrocarbon-containing gas and carbon particles of the bed, which leads to a further drop in temperature at the reactor inlet. In this case, there is an axial temperature profile which at the reactor inlet is below 800° C. As a result of the extracted enthalpy of reaction, for example a bed temperature of approximately 800° C. is established. The hydrocarbon-containing gas can for example have temperatures of room temperature, in particular of 10-15° C., to 500° C., so that at the end of this phase, for example, one half of the reaction apparatus is at a temperature of 800° C. and the other half is at the feed temperature of the hydrocarbon-containing gas. This lower temperature allows more efficient removal of the carbon.

When the introduction and conversion of the hydrocarbon-containing gas is stopped, a portion of the carbon-containing product, carbon-containing material of the bed, can if necessary be removed and discharged from the reaction apparatus.

Then, the cycle described begins anew, that is to say that hydrogen and an oxygen-containing gas are introduced again for combustion of the hydrogen for the purpose of heating the carbon-containing bed and the production of synthesis gas.

The amount produced per cycle is set via the mass of carbon and the amount of energy stored.

Through appropriate control of the process, synthesis gas can be obtained with a desired, adjustable $H_2/CO$ molar ratio. In one embodiment of the process according to the invention, at a temperature of 1600° C. a ratio of hydrogen to carbon monoxide of approximately 4 and a carbon yield of approximately 50% are attained.

In one embodiment, the temperature changes during heating in the carbon-containing bed in the reaction apparatus are effected in the form of a migrating temperature front. This is brought about by the very good heat transfer properties of the carbon or of the carbon-containing material of the bed, by the axial dispersion within the reaction apparatus (es) which greatly weakens the formation of a radial profile, or by Reynolds numbers of greater than 200. In the event of a (partial) continuous removal of solid material, the temperature front is maintained in a defined region of the reaction apparatus.

The migration speed of the temperature front in the reaction apparatus is determined via the L/D ratio (length/diameter ratio) of the reaction apparatus and via the reactant stream.

The migration speed of the temperature front w results from the quotient of the product of the gas density $\rho_g$, the heat capacity of the gas $C_{p,g}$, the flow velocity v and of the product of the solids density $\rho_s$, the heat capacity of the solid material $C_{p,s}$ and the porosity of the fixed bed with $$w = \frac{\rho_g C_{p,g} v}{[\rho_s C_{p,s}(1-\varepsilon)]}.$$

The ratio of the cycle times of the exothermic reaction $t_{exo}$ and of the endothermic pyrolytic decomposition $t_{endo}$ results from the energy balance with $$\frac{t_{exo}}{t_{endo}} = \frac{\left[\rho_{g,in} v_{in} c_{p,g}(T_{g,in} - T_{g,out}) + \rho_{gm,in} v_{in} y_{A,in} X_A (\Delta H_{s,A})\right]_{endo}}{\left[\rho_{g,in} v_{in} c_{p,g}(T_{g,in} - T_{g,out}) + \rho_{gm,in} v_{in} y_{A,in} X_A (-\Delta H_{G,A})\right]_{exo}}.$$

In a further embodiment, the cooling of the carbon or of the carbon-containing material of the bed during the endothermic, pyrolytic decomposition of the hydrocarbon-containing gas is effected in the form of a migrating temperature front which depends on the reaction kinetics and flow-mechanics properties in the reaction apparatus.

For this reason, the temperature profiles of the heating phase and pyrolysis phase (cooling phase) are preferably operated in flow reversal.

The process then starts again from the beginning with the introduction of the oxygen and of the hydrogen. This provides a cyclical, continuously repeating overall process which comprises the steps described.

In one embodiment, in particular if water is still present in the reaction apparatus after the combustion and conversion of the hydrogen to give synthesis gas, in an additional step between the heating and the cooling of the bed containing carbon-containing material (pyrolysis phase), a gaseous purging stream can flow through the reaction apparatus in order to remove water residues which may possibly still be present in the reaction apparatus from the reaction apparatus. The gaseous purging stream preferably consists of hydrogen. The flow through the reaction apparatus is preferably from the end at which the "$H_2/O_2$" reactant feed is introduced to the other end at which the synthesis gas is also discharged, particularly preferably from the top towards the bottom of the reaction apparatus.

In a further embodiment, in particular if the temperature of the carbon-containing bed has still not reached the desired lower temperature after ending the introduction of the hydrocarbon-containing gas and the pyrolysis, in an additional step after ending of the pyrolysis and before renewed heating of the carbon-containing bed, the reaction apparatus can be purged with a gaseous purging stream and hence cooled further. The gaseous purging stream is preferably hydrogen and/or a hydrocarbon. The flow through the reaction apparatus is preferably from the end at which the "hydrocarbon" reactant feed is introduced to the other end at which the hydrogen is also discharged, particularly preferably from the bottom towards the top of the reaction apparatus.

The purging streams, or purging gases, can be fed as recycle outside or inside the reaction apparatus to the corresponding reactant feeds (hydrocarbon or $H_2/O_2$). If the purging gas is hydrogen, it can for example be fed outside of the reaction apparatus to the hydrogen which is to be introduced into the reaction apparatus and which is intended to be mixed with the gaseous oxygen-containing oxidizing agent. If the purging gas is a hydrocarbon, it can for example be fed outside of the reaction apparatus to the hydrocarbon to be introduced into the reaction apparatus for the purpose of pyrolysis. In this way, a material circuit is created which ensures optimal exploitation and use of the material streams employed.

The process according to the invention is typically conducted at atmospheric pressure up to a pressure of 50 bar, in another embodiment even up to 70 bar. The process is advantageously conducted at atmospheric pressure up to a pressure of 30 bar, preferably at atmospheric pressure up to a pressure of 20 bar, in another preferred embodiment at atmospheric pressure up to a pressure of 10 bar. A high pressure in the pyrolysis stage is compatible both with upstream and downstream stages. The pressure in natural gas pipelines is typically 50 bar.

For increasing capacities and improved control of the process, two or more reaction apparatuses can be connected to one another, a portion of the hydrogen formed during the pyrolysis of the hydrocarbon in one reaction apparatus being directly used further for the synthesis gas production in the other reaction apparatus.

For this, at least two reaction apparatuses, each having a carbon-containing bed of the type described above, are used and are connected to one another via at least one connection for the passage of the hydrogen.

In one embodiment of the process according to the invention, at least two reaction apparatuses are used for the production of synthesis gas during the heating phase and for the production of carbon and hydrogen during the cooling phase of the bed of carbon-containing material. In this case, in one apparatus synthesis gas is produced during the heating phase and in parallel in the other apparatus carbon and hydrogen are produced during the cooling phase, and the apparatuses are operated anticyclically to one another. The at least two reaction apparatuses are connected to one another by means of at least one connecting line.

While, for example, the pyrolytic decomposition of the hydrocarbon takes place in the first reaction apparatus with simultaneous cooling of the carbon-containing bed, at least a portion of the resulting hydrogen can be fed via a connecting line to the reactant feed ($H_2/O_2$) of the second reaction apparatus in order to be reacted with the oxygen-containing gas and to be used for the synthesis gas generation taking place there. During the synthesis gas generation in the second reaction apparatus, the carbon-containing bed present there heats up, so that a following pyrolysis of hydrocarbons can be subsequently performed in this second reaction apparatus. The hydrogen formed is then at least partially recycled into the first reaction apparatus in order to provide there the hydrogen for a heating phase so that a following synthesis gas generation can take place there. The reaction steps therefore take place alternately.

With such a process, a continuous and simultaneous production of the desired products synthesis gas, hydrogen and carbon can be achieved.

A further aspect of the invention relates to an apparatus for producing hydrogen, carbon monoxide and a carbon-containing product according to the process described above.

The apparatus for the described process for producing hydrogen, carbon monoxide and a carbon-containing product comprises in one embodiment (A) a reaction apparatus comprising a bed of carbon-containing material (B) a first means for introducing and/or discharging fluids at one end of the reaction apparatus and (C) a second means for introducing and/or discharging fluids at the other end of the reaction apparatus.

In addition to the bed of carbon-containing material, the reaction apparatus may optionally also include other elements such as feed and discharge lines, burner, quench, etc.

In one embodiment, the reaction apparatus is configured as a vertical shaft. In a preferred embodiment, the reaction apparatus has a cylindrical cross section.

The means (B) and (C) are preferably a line or at least two lines which are suitable for feeding or discharging the reactant and product streams.

In one embodiment, the first means (B) is suitable in particular for introducing and/or discharging oxygen, hydrogen and/or hydrocarbons and the second means (C) is suitable for introducing and/or discharging hydrogen, carbon monoxide and/or hydrocarbons.

In an alternative form of the apparatus, at least two reaction apparatuses of the type described above are coupled together and are connected to one another via at least one connection for the passage of the hydrogen.

All of the embodiments described in connection with the process according to the invention apply analogously to the apparatus according to the invention and are therefore not repeated here.

The apparatus according to the invention is particularly suitable for performing the process according to the invention. A further aspect of the invention therefore relates to the use of the apparatus according to the invention in the process according to the invention.

A further aspect of the present invention is the use of the carbon-containing product as described above as injection coal, as coking coal additive, as blast furnace coke or as electrode material.

Further preferred embodiments Em1 to Em18 are as follows:

Em1: Process for producing hydrogen, carbon monoxide and a carbon-containing product in at least one reaction apparatus,
  wherein the at least one reaction apparatus comprises a bed of carbon-containing material and is characterized in that
    the bed of carbon-containing material in the at least one reaction apparatus is alternately heated to a temperature of >800° C. and, no later than upon reaching a temperature of 1800° C., cooled to ≤900° C., wherein
  hydrogen and carbon monoxide are produced during the heating phase
  and
  carbon and hydrogen are produced during the cooling phase.

Em2: Process according to Em1, wherein the process comprises the following steps:
  (a) providing hydrogen and oxygen
  (b) heating the bed of carbon-containing material to a temperature of >800° C. by reacting hydrogen with oxygen
  (c) drawing off the hydrogen and carbon monoxide formed
  (d) ending the provision of hydrogen and oxygen no later than upon reaching a temperature of the bed of carbon-containing material of 1800° C.
  (e) providing a gaseous hydrocarbon stream and decomposing the hydrocarbons in the presence of the bed of carbon-containing material to give carbon and hydrogen, the temperature of the bed of carbon-containing material decreasing in the process
  (f) drawing off the hydrogen
  (g) ending the provision of a gaseous hydrocarbon stream no later than upon reaching a temperature of the bed of carbon-containing material of ≤900° C.
  (h) withdrawing at least a portion of the carbon-containing material of the bed, wherein the carbon-containing material includes a deposit comprising the carbon-containing product
  wherein steps (a) to (h) are conducted in the at least one reaction apparatus.

Em3: Process according to any of the preceding Ems, wherein
  the at least one reaction apparatus is connected to a further reaction apparatus, and
  while steps (e) to (h) are conducted in the at least one reaction apparatus, steps (a) to (d) are conducted in the further reaction apparatus, and
  the hydrogen formed in the at least one reaction apparatus is fed at least in part to the further reaction apparatus and is reacted with oxygen, and
  on reaching the respective temperatures, the process regime is inverted, and while steps (a) to (d) are conducted in the at least one reaction apparatus, steps (e) to (h) are conducted in the further reaction apparatus.

Em4: Process according to any of the preceding Ems, wherein hydrogen and oxygen are introduced into the reaction apparatus and combusted, preferably at the end of the reaction apparatus at which they are introduced.

Em5: Process according to any of the preceding Ems, wherein the bed of carbon-containing material in the at least one reaction apparatus is alternately heated to a temperature of >900° C. and, no later than upon reaching a temperature of 1800° C., cooled to 900° C.

Em6: Process according to any of the preceding Ems, wherein the bed of carbon-containing material is heated to a temperature in the range from 1400° C. to 1800° C.

Em7: Process according to any of the preceding Ems, wherein the bed of carbon-containing material is cooled to a temperature of 900° C.

Em8: Process according to any of the preceding Ems, wherein the gaseous hydrocarbon stream is natural gas.

Em9: Process according to any of the preceding Ems, wherein the gaseous hydrocarbon stream is methane.

Em10: Process according to any of the preceding Ems, wherein the bed of carbon-containing material is a fixed bed.

Em11: Process according to any of the preceding Ems, wherein the provision of hydrogen and oxygen and of the gaseous hydrocarbon stream are operated in flow reversal.

Em12: Process according to any of the preceding Ems, wherein steps (a) to (h) as an overall process are repeated cyclically and continuously.

Em13: Process according to any of the preceding Ems, wherein in a further step (d1), between steps (d) and (e), a gaseous stream is led through the reaction apparatus as an agent for purging, preferably composed of hydrogen.

Em14: Process according to any of the preceding Ems, wherein in a further step (g1), between steps (g) and (h), a gaseous stream is led through the reaction apparatus as a purging agent, preferably composed of hydrogen or methane.

Em15: Process according to any of the preceding Ems, wherein, when heating the bed of carbon-containing material to a temperature of 1600° C., an $H_2/CO$ ratio of approximately 4 and a carbon yield of approximately 50% are achieved.

Em16: Use of the carbon-containing product according to any of the preceding Ems, as injection coal, as coking coal additive, as blast furnace coke or as an electrode material.

Em17: Apparatus for performing a process according to any of the preceding Ems1 to 15.

Em18: Apparatus according to Em17, wherein the apparatus for producing hydrogen, carbon monoxide and a carbon-containing product comprises
  (A) a reaction apparatus comprising a bed of carbon-containing material
  (B) a first means for introducing and/or discharging fluids at one end of the reaction apparatus and
  (C) a second means for introducing and/or discharging fluids at the other end of the reaction apparatus.

The invention is explained below with reference to drawings. These explanations are merely by way of example and do not restrict the general inventive concept.

DETAILED DESCRIPTION OF THE INVENTION

Figure 1:
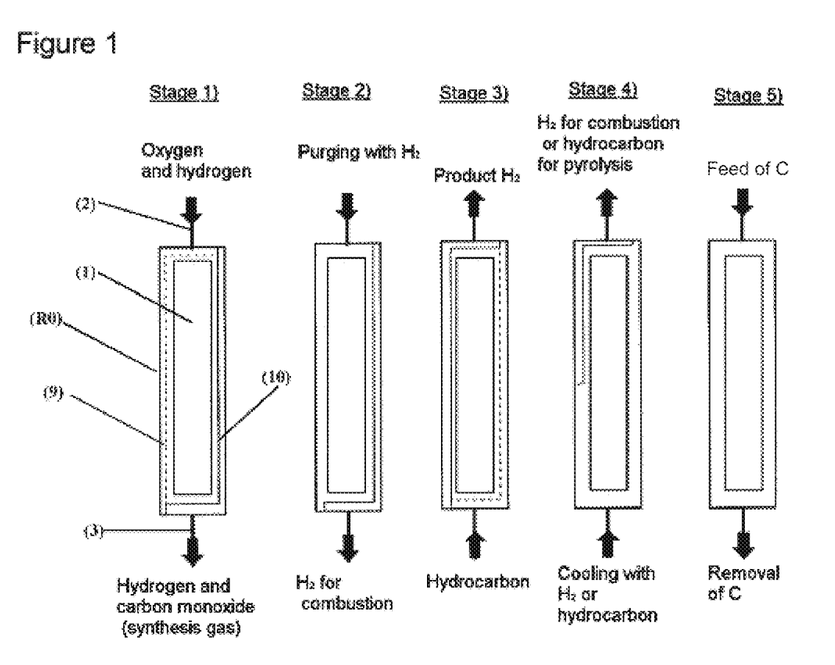
FIG. 1 shows the principle of the process steps for performing the process according to the invention

FIG. 1 schematically shows stages 1 to 5 for performing the process according to the invention in a reaction apparatus (R0), equipped with a carbon-containing bed (1), a means (2) at the top of the reaction apparatus (R0) and a second means (3) at the bottom of the reaction apparatus (R0), which are used for introducing and discharging the gases and material streams employed in the process.

In stage 1, oxygen and hydrogen are introduced at the top of the reaction apparatus (R0) via means (2) into the interior of the reaction apparatus (R0) and combusted. The oxygen reacts with the hydrogen to give water, with the release of heat. At the same time, the carbon-containing bed (1) heats up as a result of the thermal energy formed during the exothermic reaction, to a temperature of between 1400° C. and 1800° C. The resulting water reacts with the carbon in the carbon-containing bed (1) to form synthesis gas, consisting of carbon monoxide and hydrogen. The synthesis gas as product is drawn off at the bottom of the reaction apparatus (R0) via means (3). The dashed temperature front line (9) shown in the reaction apparatus (R0) schematically indicates the cool state of the carbon-containing bed (1), where the temperature front (9) at the start of the reaction is situated in the upper region of the reaction apparatus (R0), since the bed has not yet heated up. In the heating phase of the carbon-containing bed, the temperature front shifts into the lower region of the reaction apparatus (R0), which is schematically illustrated with the solid temperature front line (10) in the heated state.

In stage 2, the feed of oxygen and hydrogen into the reaction apparatus (R0) is stopped upon reaching the maximum plateau temperature, which is in the range from 1400 to 1800° C. in the carbon-containing bed (1). In the event that the reaction apparatus (R0) still has water residues, hydrogen for purging the reaction apparatus (R0) is introduced at the top of the reaction apparatus (R0) via means (2) and discharged at the bottom of the reaction apparatus (R0) via means (3). This allows the water residues to be removed from the reaction system. The solid temperature front line (10) shows that the carbon-containing bed remains heated.

Subsequently, in stage 3 hydrocarbon is introduced at the bottom of the reaction apparatus (R0) via means (3). By means of the thermal energy stored in the carbon-containing bed (1), the hydrocarbon is pyrolyzed to hydrogen and carbon, the carbon-containing bed (1) cooling to not more than 900° C. in the process. The newly formed hydrogen is drawn off as product via means (2), while the carbon formed is deposited on the carbon-containing bed (1) as carbon-containing product. The amount of carbon-containing product per cycle is set here via the mass of carbon and the amount of energy stored. As a result of the cooling of the carbon-containing bed (1), the solid temperature front line (10) shifts into the upper region of the reaction apparatus (R0). The dashed temperature front line (9) indicates the cooled temperature front.

In stage 4, with a continuous removal of the carbon-containing bed (1), the temperature front is kept in a defined region of the reaction apparatus (R0). This can be illustrated with the temperature profile line, the temperature front here being shown by way of example up to the middle of the reaction apparatus (R0). To further lower the temperature, the reaction apparatus (R0) is purged with a hydrocarbon or hydrogen, by introducing the corresponding gas at the bottom of the reaction apparatus (R0) via means (3) and discharging it at the top of the reaction apparatus (R0) via means (2).

In stage 5, a portion of the carbon-containing bed (1) is withdrawn from the reaction apparatus (R0) and new carbon-containing material is introduced. The reaction apparatus (R0) is then back in the starting state and the process can start from the beginning. The process can therefore be performed cyclically and continuously.

Figure 2:
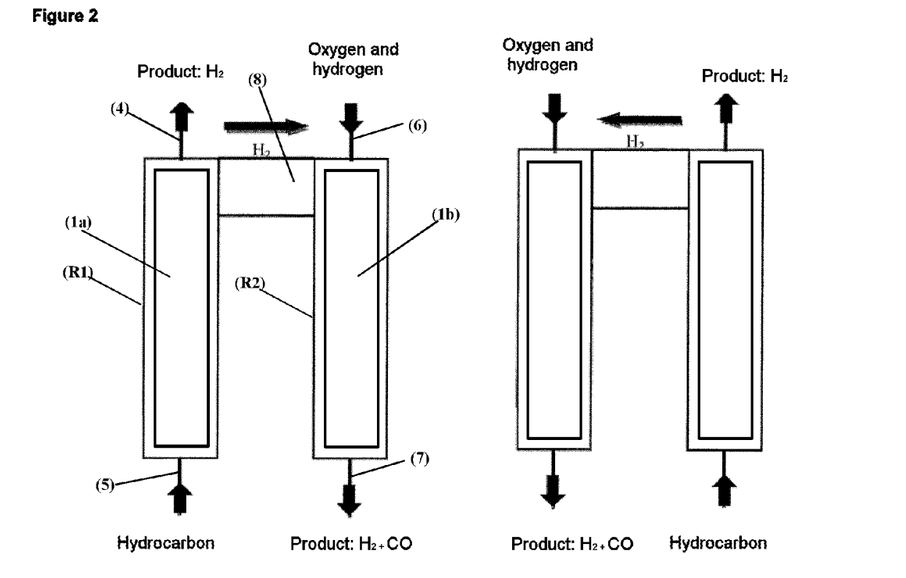
FIG. 2 shows the principle for performing the process according to the invention when at least two reaction apparatuses are coupled together.

FIG. 2 shows an embodiment for performing the process according to the invention using two reaction apparatuses (R1) and (R2) which are connected to one another via connection (8) and which each include a carbon-containing bed—(1a) and (1b). In phase 1, hydrocarbon is introduced at the bottom of the reaction apparatus (R1) via means (5) and pyrolytically decomposed at a temperature of ≥900° C., typically from 1400° C. to 1800° C., forming carbon and hydrogen. The carbon is deposited on the carbon-containing bed (1a), while a portion of the hydrogen is discharged at the top of the reaction apparatus (R1) via means (4) and another portion is led into the second reaction apparatus (R2) via the connection (8). This hydrogen is fed to the oxygen and hydrogen introduced at the top of the reaction apparatus (R2) via means (6). The hydrogen fed from the reaction apparatus (R1) is combusted superstoichiometrically with the oxygen and the other hydrogen at the top of the reaction apparatus (R2), the carbon-containing bed (1b) heating up to a temperature of 1400° C. to 1800° C. in the process. This results in the formation of water, this water reacting further with the carbon in the carbon-containing bed (1b) to give synthesis gas. The synthesis gas is then drawn off at the bottom of the reaction apparatus (R2) via means (7). At the same time, the carbon-containing bed (1a) of the reaction apparatus (R1) cools down during the pyrolysis.

When the maximum plateau temperature of 1400 to 1800° C. is reached in the reaction apparatus (R2), the introduction of the reactant gases is stopped and the overall process is inverted.

In phase 2, hydrocarbon is introduced at the bottom of the reaction apparatus (R2) via means (7) and is then pyrolytically decomposed into hydrogen and carbon by means of the thermal energy in the carbon-containing bed (1b). The pyrolysis carbon is deposited on the carbon-containing bed (1b), while a portion of the hydrogen is discharged at the top of the reaction apparatus (R2) via means (6). The other portion of the hydrogen is led into the reaction apparatus (R1) via connection (8), with oxygen and hydrogen simultaneously being introduced at the top of the reaction apparatus (R1) via means (4) and these gases being combusted together to form water. This combustion reaction in turn heats the carbon bed (1a) in the reaction apparatus (R1). The water reacts with the carbon in the carbon-containing bed (1a) to give synthesis gas, which is drawn off at the bottom of the reaction apparatus (R1) via means (5). At the same time, the carbon-containing bed (1b) of the reaction apparatus (R2) cools down during the pyrolysis.

Partial removal of the carbon-containing product from the carbon-containing bed can be effected both cyclically and continuously. The passage of hydrogen or hydrocarbons for purging or cooling the reaction apparatus and/or the carbon-containing bed is preferably conducted between the individual steps.

Phase 1 then starts again and the process is continued in alternating fashion or cyclically. It is thus possible to continuously simultaneously produce hydrogen, carbon monoxide and a carbon-containing product and to discharge them from the system.

LIST OF REFERENCE SIGNS

R0 reaction apparatus
R1 reaction apparatus
R2 reaction apparatus
1 carbon-containing bed
1a carbon-containing bed
1b carbon-containing bed
2 means for introducing and/or discharging
3 means for introducing and/or discharging
4 means for introducing and/or discharging
5 means for introducing and/or discharging
6 means for introducing and/or discharging
7 means for introducing and/or discharging
8 connection
9 dashed temperature front line
10 solid temperature front line

The invention claimed is:

1. A process for producing molecular hydrogen ($H_2$), carbon monoxide and a carbon-containing product, the process comprising the following steps:
(a) providing molecular hydrogen ($H_2$) and molecular oxygen ($O_2$),
(b) heating a bed of carbon-containing material to a temperature of >800° C. by reacting the molecular hydrogen ($H_2$) with the molecular oxygen ($O_2$), wherein steps (a) and (b) proceed in the same reaction apparatus,
(c) drawing off the synthesis gas formed, containing molecular hydrogen ($H_2$) and carbon monoxide,
(d) ending the provision of molecular hydrogen ($H_2$) and molecular oxygen ($O_2$) no later than upon reaching a temperature of the bed of carbon-containing material of 1800° C.,
(e) providing a gaseous hydrocarbon stream and decomposing the hydrocarbons in the presence of the bed of carbon-containing material to give carbon and molecular hydrogen ($H_2$), the temperature of the bed of carbon-containing material decreasing in the process,
(f) drawing off the molecular hydrogen ($H_2$),
(g) ending the provision of a gaseous hydrocarbon stream no later than upon reaching a temperature of the bed of carbon-containing material of ≤900° C., and
(h) withdrawing at least a portion of the carbon-containing material of the bed, wherein the carbon-containing material includes a deposit comprising the carbon-containing product.

2. The process as claimed in claim 1, wherein
the reaction apparatus is connected to a further reaction apparatus, which likewise contains a bed of carbon-containing material, and
while steps (e) to (h) are conducted in the reaction apparatus, steps (a) to (d) are conducted in the further reaction apparatus, and
the molecular hydrogen ($H_2$) formed in the reaction apparatus is fed at least in part to the further reaction apparatus and is reacted with molecular oxygen ($O_2$), and
on reaching the respective temperatures, the process regime is inverted, and while steps (a) to (d) are conducted in the reaction apparatus, steps (e) to (h) are conducted in the further reaction apparatus.

3. The process as claimed in claim 1, wherein molecular hydrogen ($H_2$) and molecular oxygen ($O_2$) are introduced into the reaction apparatus and/or the further reaction apparatus and combusted, preferably at the respective end of the reaction apparatus and/or further reaction apparatus at which they are introduced.

4. The process as claimed in claim 1, wherein the respective bed of carbon-containing material in the reaction apparatus and/or the further reaction apparatus is alternately heated to a temperature of >900° C. and, no later than upon reaching a temperature of 1800° C., cooled to ≤900° C.

5. The process as claimed in claim 1, wherein the respective bed of carbon-containing material in the reaction apparatus and/or the further reaction apparatus is heated to a temperature in the range from 1400° C. to 1800° C.

6. The process as claimed in claim 1, wherein the respective bed of carbon-containing material in the reaction apparatus and/or the further reaction apparatus is cooled to a temperature of ≤900° C.

7. The process as claimed in claim 1, wherein the gaseous hydrocarbon stream is natural gas or methane.

8. The process as claimed in claim 1, wherein the respective bed of carbon-containing material in the reaction apparatus and/or the further reaction apparatus is a fixed bed.

9. The process as claimed in claim 1, wherein the provision of molecular hydrogen ($H_2$) and molecular oxygen ($O_2$) and of the gaseous hydrocarbon stream are operated in flow reversal.

10. The process as claimed in claim 1, wherein steps (a) to (h) as an overall process are repeated cyclically and continuously.

11. The process as claimed in claim 1, wherein in a further step (d1), between steps (d) and (e), a gaseous stream is led through the reaction apparatus and/or the further reaction apparatus as an agent for purging, preferably composed of molecular hydrogen ($H_2$).

12. The process as claimed in claim 1, wherein in a further step (g1), between steps (g) and (h), a gaseous stream is led through the reaction apparatus and/or the further reaction apparatus as a purging agent, preferably composed of molecular hydrogen ($H_2$) or methane.

13. The process as claimed in claim 1, wherein, when heating the bed of carbon-containing material to a temperature of 1600° C., an $H_2$/CO molar ratio of approximately 4 and a carbon yield of approximately 50% are achieved.

* * * * *